United States Patent [19]

Ishiguro

[11] 4,222,652
[45] Sep. 16, 1980

[54] ELECTRIC SHUTTER FOR CAMERAS

[75] Inventor: Yasuo Ishiguro, Tokyo, Japan

[73] Assignee: Copal Company Limited, Tokyo, Japan

[21] Appl. No.: 870,268

[22] Filed: Jan. 17, 1978

[30] Foreign Application Priority Data

Jan. 22, 1977 [JP] Japan .................................. 52-6623[U]

[51] Int. Cl.³ .......................... G03B 9/08; G03B 17/00
[52] U.S. Cl. ..................................... 354/234; 354/289
[58] Field of Search ............... 354/234, 235, 256, 258, 354/266–268, 289, 48, 60 R

[56] References Cited

U.S. PATENT DOCUMENTS

| 2,978,970 | 4/1961 | Fahlenberg | 354/133 |
| 3,766,840 | 10/1973 | Loseries | 354/235 |
| 3,772,979 | 11/1973 | Imura | 354/256 X |
| 3,906,532 | 9/1975 | Kuramoto et al. | 354/258 |
| 3,961,338 | 6/1976 | Sahara | 354/51 X |
| 4,133,608 | 1/1979 | Tanaka | 354/235 |
| 4,134,658 | 1/1979 | Suzuki et al. | 354/266 |

FOREIGN PATENT DOCUMENTS 2554409 10/1976 Fed. Rep. of Germany ........... 354/235

*Primary Examiner*—L. T. Hix
*Assistant Examiner*—William B. Perkey
*Attorney, Agent, or Firm*—Cushman, Darby & Cushman

[57] ABSTRACT

An electric shutter for cameras wherein a shutter closing motion can be started by a manual operation from outside the camera body even when the automatic closing motion of the shutter can be no longer made due to the consumption of the current source battery.

5 Claims, 7 Drawing Figures

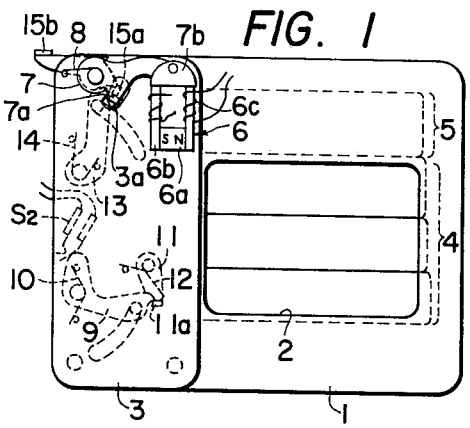
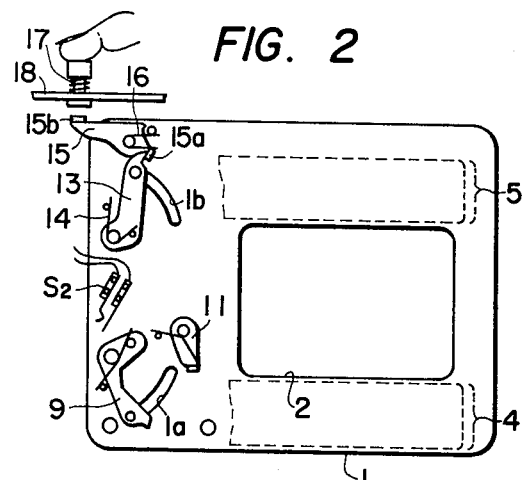
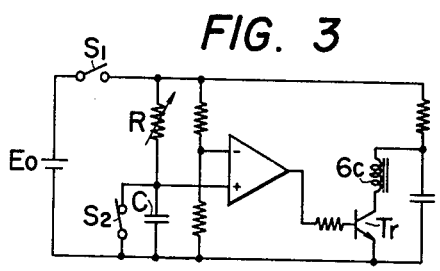

ELECTRIC SHUTTER FOR CAMERAS

BACKGROUND OF THE INVENTION (a) Field of the Invention

This invention relates to improvements in electric shutters for cameras.

(b) Description of the Prior Art

Generally an electric shutter for cameras is so arranged that, by a shutter releasing operation, a shutter opening driving member may be started to begin an exposure and, when a proper exposure time has elapsed, an electromagnetic device may work to start a shutter closing driving member to complete the exposure. Now, in the conventional electric shutter, in case the current source voltage drops to be below a predetermined level due to the consumption of the current source battery or no electric current flows at all to the electromagnetic device due to any cause, even if the proper exposure time elapses, the electromagnetic device will not be excited well or at all and therefore the shutter will remain open. Therefore, in such case, until the current source battery is replaced with a new one or the trouble is remedied, not only the next photographing but also the rewinding of the film will be able to be made, much to the disadvantage. In order to eliminate such defect, there is already suggested an automatic switching system wherein, when the voltage of the current source battery drops to be below a predetermined value, after the lapse of a fixed exposure time determined only by a mechanical means, the shutter will be closed. However, such system has defects that the mechanism is complicated and that the cost is high.

SUMMARY OF THE INVENTION

A primary object of the present invention is to provide an electric shutter for cameras wherein a shutter closing driving member can be positively started from outside the camera body by only attaching a very simple device.

Another object of the present invention is to provide an electric shutter for cameras arranged so as to be able to start a shutter closing driving member with a very simple manual operation.

A further object of the present invention is to attach a manually operating device for starting a shutter closing driving member without particularly modifying the design of the camera body.

These and other objects of the present invention will become more apparent during the course of the following detailed description and appended claims.

BRIEF DESCRIPTION OF THE DRAWINGS

FIG. 1 is an elevational view of an essential portion showing an embodiment of the electric shutter according to the present invention;

FIG. 2 is an elevational view of the essential portion of the electric shutter shown in FIG. 1 when the shutter is fully opened;

FIG. 3 is a wiring diagram showing an electric exposure time controlling circuit;

FIG. 4 is a somewhat enlarged elevational view of an essential portion showing another embodiment of the electric shutter according to the present invention;

DESCRIPTION OF THE PREFERRED EMBODIMENTS

Figure 5:
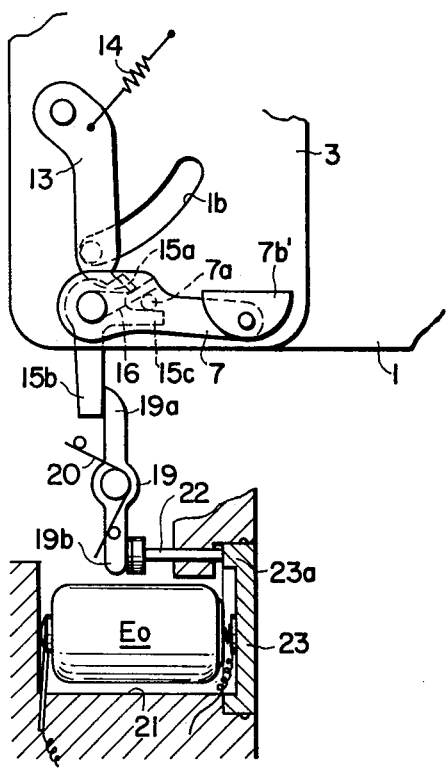
FIG. 5 is a partial elevational view showing a further embodiment of the electric shutter according to the present invention.

Various embodiments of the present invention as applied to focal plane type electric shutters shall be described in the following with reference to the drawings.

In FIG. 1, reference numeral 1 indicates a shutter base plate forming an exposure aperture 2. 3 indicates an auxiliary base plate secured at a spacing above the shutter base plate 1. 4 indicates a front curtain (or blade) group. 5 indicates a rear curtain (or blade) group. Such group can be formed of one or more opaque metallic laminae or curtains. 6 indicates an electromagnetic device secured on the auxiliary base plate 3 and consisting of a permanent magnet 6a and a coil 6c wound around an iron core 6b. 7 indicates an armature lever provided with a bent portion 7a projecting on the back side and a rockable armature 7b opposed to the iron core 6b and rotatably supported on the auxiliary base plate 3. The armature lever 7 is biased counterclockwise by a spring member 8 but can be held in the illustrated position by being attracted by the electromagnetic device 6. The bent portion 7a extends into a space defined by the shutter base plate 1 and auxiliary base plate 3 through a hole 3a formed in the auxiliary base plate 3 and is engaged with a bent portion 15a of a later described locking lever 15. 9 indicates a shutter opening driving member or front curtain driving lever rotatably supported on the shutter base plate 1 and biased clockwise by a spring member 10 but capable of being locked in the illustrated position by being engaged with the bent portion 11a of a locking lever 11. The locking lever 11 is rotatably supported on the shutter base plate 1 and is biased clockwise by a spring member 12 but is retained in the illustrated position by a member not illustrated. In FIG. 2 (in which the auxiliary base plate 3 is removed from FIG. 1 and the exposure aperture 2 is opened with the front curtain group 4), reference numeral 13 indicates a shutter closing driving member or rear curtain driving lever rotatably supported on the shutter base plate 1 and biased clockwise by a spring member 14 but capable of being locked in the illustrated position by being engaged with a bent portion 15a of the locking lever 15. The locking lever 15 has an arm portion 15b, is rotatably supported on the shutter base plate 1 and is biased clockwise by a spring member 16 but is retained in the illustrated position by being engaged with the bent portion 7a of the armature lever 7. 17 indicates a push button arranged as opposed to an arm portion 15b of the locking lever 15 and projected above the camera body 18. The push button is so formed as to move downward when pushed and to return to the illustrated position when the pressing force is released. Symbol $S_2$ indicates a normally closed type switch.

Now the operation of the above described device shall be explained.

First of all, in the cocked state in FIG. 1, the armature lever 7 is held in the illustrated position by having the armature 7b attracted by the electromagnetic device 6, the front curtain group 4 closes the exposure aperture 2 and the rear curtain group 5 is folded on the upper side of the exposure aperture 2. In this state, when a shutter release button not illustrated is pushed, first the locking lever 11 will be rotated counterclockwise to unlock the front curtain driving lever 9. Therefore, the front curtain driving lever 9 will be rotated clockwise by the spring member 10 and will be moved downward while folding the front curtain group 4 to open the exposure aperture 2 as shown in FIG. 2 to begin an exposure. On the other hand, simultaneously with the above mentioned shutter release, a switch $S_1$ will be closed in the circuit shown in FIG. 3 and said circuit will begin to operate. As operatively connected with the opening operation of the front curtain group 4, the switch $S_2$ will be opened and the well known R-C exposure time controlling circuit will begin to operate. After the exposure aperture 2 is opened, after the lapse of a proper exposure time, when a transistor Tr becomes on, an electric current will flow for a short time to the coil 6c to excite the iron core 6b. As the direction of the magnetic field produced by passing the current to the coil 6c in this case is made to be reverse to the direction of the magnetic field of the permanent magnet 6a, the magnetic field produced by the electromagnetic device 6 simultaneously with the excitation of the coil 6c will vanish as a result. Therefore, the armature lever 7 will be made counterclockwise rotatable by the returning force of the spring member 8 and the bent portion 7a will push the bent portion 15a of the locking lever 15 to rotate the locking lever 15 counterclockwise. Therefore, the rear curtain driving lever 13 will be rotated clockwise by the returning force of the spring member 14 and the rear curtain group 5 will be lowered while being developed from the state in FIG. 2 to cover the exposure aperture 2 to complete one photographing.

When the voltage of a current source battery $E_0$ in this case is below a rated value, the electric current flowing to the coil 6c is not sufficient and the magnetic field of the electromagnetic device 6 does not well vanish, even after the lapse of the proper exposure time, the armature lever 7 will not be able to rotate counterclockwise and therefore the rear curtain group 5 will not be able to cover the exposure aperture 2. Therefore, in this case, when the push button 17 outside the camera body 18 is pushed, the locking lever 15 will be forcibly rotated counterclockwise to unlock the rear curtain driving lever 13 and operate the rear curtain group 5. Therefore, the rear curtain group 5 will operate to cover the exposure aperture 2 from the state in FIG. 2.

The embodiment arranged so as to close the shutter by pushing the push button 17 has been described in the above. Such forcible closure of the shutter can be made also in association with the removal of the current source battery $E_0$ from the battery box or the opening of the lid of the battery box. FIGS. 4 and 5 show respectively such embodiments.

FIG. 4 shows substantially the same shutter device as is shown in FIG. 1 except that the locking lever 15 is so arranged as to be rotated in association with taking the current source battery out of the battery box. Therefore, here the same reference numerals shall be used respectively for substantially the same parts and portions as are shown in FIG. 1 and the detailed explanations of the formation and operation of the embodiment shall be omitted. In this embodiment, the armature lever 7 is provided with a pin 7a made engageable with a short arm 15c of the locking lever 15. A spring member 16 biasing the locking lever 15 and armature lever 7 so as to be rotatable in directions reverse to each other is stretched between the bent portion 15a of the locking lever 15 and the pin 7a of the armature lever 7. Reference numeral 19 indicates an intermediate lever rotatably supported on the camera body, biased counterclockwise by a spring member 20 and having an arm 19a engaging with the arm 15b of the locking lever 15. 21 indicates a battery box defined within the camera body and removably housing the current source battery $E_0$. 22 indicates an interlocking rod slidably inserted through the side wall of the battery box 21 and contacting at one end with an arm 19b of the intermediate lever 19 and at the other end with one end surface of the housed battery $E_0$. Therefore, when the current source battery $E_0$ is taken out of the battery box 21, the intermediate lever 19 will be rotated counterclockwise by the tension of the spring member 20 and the arm 19a will push the arm 15b to clockwise rotate only the locking lever 15 against the tension of the spring 16 and to disengage the bent portion 15a from the rear curtain driving lever 13. Therefore, the rear curtain driving lever 13 will rotate counterclockwise to run the rear curtain group to cover the exposure aperture 2. Then, if a new battery $E_0$ is put into the battery box 21, the intermediate lever 19 will be returned to the illustrated position by the arm 19b pushed by the interlocking rod 22. As a result, the locking lever 15 will be also rotated counterclockwise by the tension of the spring 16 to be returned to the illustrated position.

FIG. 5 shows an embodiment wherein the shutter is closed by opening or removing the lid of the battery box. Here also the same reference numerals are attached respectively to substantially the same parts or portions as are shown in FIG. 4. That is to say, an annular flange 23a in contact with the end of the interlocking rod 22 is formed inside a lid 23 for closing the opening of the battery box 21 and when the lid 23 closes the battery box 21, that is, in the normal state, the interlocking pin 22 will be pushed leftward by the flange 23a and therefore the intermediate lever 19 and locking lever 15 will be in the illustrated positions. However, if the lid 23 is opened or removed, the intermediate lever 19 will be rotated counterclockwise by the tension of the spring member 20 to clockwise rotate the locking lever 15 against the spring member 16. Therefore, the rear curtain driving lever 13 will rotate counterclockwise to run the rear curtain group 4 to cover the exposure aperture 2.

In each of the above mentioned embodiments, the electromagnetic device is formed to be of an electromagnet type but may be of a plunger type. Also a type wherein, for example, both front and rear curtains are operated in a linear motor type is applicable. In such case, the device will effectively operate when the voltage of the current source battery is sufficient for the operation of the front curtain group but is insufficient for the operation of the rear curtain group. Further, in each of the above mentioned embodiments, the type wherein the armature lever is attracted by the permanent magnet in advance has been explained. However, the present invention is applicable also to a type wherein, after the lapse of a proper exposure time, when the electromagnet is excited, an armature lever separated from the electromagnet until then will be attracted. Further, the armature lever 7 and locking lever 15 may be integrally formed.

Figure 7:
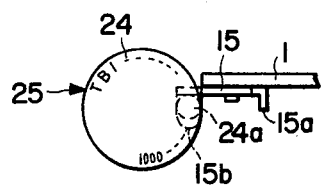
Figure 6:
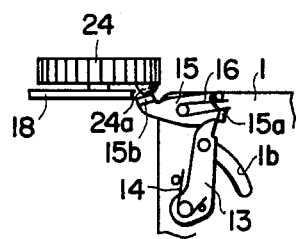
FIG. 6 is a partial elevational view showing a further embodiment of the electric shutter according to the present invention.

As evident from the above explanation, the device according to the present invention can be utilized also as a "time-exposure" device. A preferred embodiment in such case is shown in FIGS. 6 and 7. That is to say, reference numeral 24 indicates a shutter speed dial rotatably mounted on the camera body 18 and having a hemispherical projection 24a engageable with the bent portion 15b of the locking lever 15 on the peripheral edge portion on the lower surface of the dial. In the case of performing a "time-exposure", first the current source switch $S_1$ is forcibly manually kept opened or the current source battery $E_0$ is kept removed in advance, the shutter is opened by pressing the shutter button and, when a desired time has elapsed, the speed dial 24 may be rotated to fit a mark, for example, "T" engraved on it to a fixed index 25. That is to say, when the mark "T" is fitted to the fixed index 25, the projection 24a will mount on the bent portion 15b of the locking lever 15 and will counterclockwise rotate the locking lever 15 the same as in the case that the push button 17 in FIG. 2 is pushed down. Therefore, as already described, the rear curtain group 4 will run to close the shutter to complete one "time-exposure".

It is needless to say that the present invention is not limited to the above mentioned embodiments and can be applied also to shutters of a type wherein a set of shutter blades is opened by a shutter opening driving member and is closed by a shutter closing driving member.

I claim:

1. An electric shutter device for cameras comprising a shutter base plate adapted to be attached to a camera body, a shutter closing driving member rotatably supported on said shutter base plate and movable between a cocked position and an uncocked position, a locking member rotatably supported on said shutter base plate and engageable with said driving member for locking said driving member in the cocked position, an armature lever operatively related to said locking member, an electromagnetic device arranged adjacent to said armature lever, said electromagnetic device including a permanent magnet normally attracting said armature lever to retain said locking member in a position wherein said driving member is cocked, said armature lever being released from the permanent magnet to in turn release said locking member and said driving member when said electromagnetic device is energized, an exposure time controlling circuit connected to said electromagnetic device, a current source battery connected to said exposure time controlling circuit and capable of supplying an electric current to said electromagnetic device to energize said electromagnetic device when a proper exposure time determined by said exposure time controlling circuit has elapsed, and a manually operable device arranged adjacent to said locking member on said camera body for operating said locking member to release said driving member on actuation of the manually operable device.

2. An electric shutter device for cameras according to claim 1 wherein said manually operable device comprises a push button engageable with said locking member and means for slidably mounting said push button on said camera body, said locking member being operated by said push button when it is pressed.

3. An electric shutter device for cameras according to claim 1 wherein said manually operable device comprises an intermediate lever engaged with said locking lever, means for rotatably mounting said intermediate lever on the camera body, an interlocking rod engaged at one end with said intermediate lever and at the other end with the end surface of said current source battery contained within the camera body and means for slidably mounting said interlocking rod on the camera body, said locking member being operated by said intermediate lever when said current source battery is taken out of said camera body.

4. An electric shutter device for cameras according to claim 1 wherein said manually operable device comprises an intermediate lever engaged with said locking lever, means for rotatably mounting said intermediate lever on the camera body, an interlocking rod engaged at one end with said intermediate lever and at the other end with a lid for a battery box defined within the camera body and means for slidably mounting said interlocking rod on the camera body, said locking member being operated by said intermediate lever when said lid is opened.

5. An electric shutter device for cameras according to claim 1 wherein said manually operable device comprises a shutter speed dial having thereon a projection engageable with said locking member and means for rotatably mounting said shutter speed dial on the camera body, said locking member being operated by said projection when said shutter speed dial is rotated to a predetermined position.

* * * * *